Sept. 6, 1955  J. R. HOLLINS  2,717,331
THERMOSTATICALLY OPERATED TIME DELAY SWITCHES
Filed July 19, 1954

INVENTOR
Jesse R Hollins
BY
ATTORNEY

2,717,331

THERMOSTATICALLY OPERATED TIME DELAY SWITCHES

Jesse R. Hollins, Brooklyn, N. Y.

Application July 19, 1954, Serial No. 444,136

18 Claims. (Cl. 315—77)

This invention relates to thermostatically operated time delay switches embodying means for selectively rendering ineffective the thermostatic operating means. In a more particular aspect, the invention is directed to a turn signal selection switch for automotive vehicles which is automatically restored to neutral, after a pre-set time interval, by thermostatic control means, and in which the operation of said control means may be selectively delayed responsive to operation of a control pedal of the vehicle.

The conventional factory installed selector switch for vehicle turn signalling systems is mounted on the steering column and includes cams of friction rollers co-operable with means on the steering shaft to "cancel" the signal and restore the selector switch to neutral. As the vehicle completes the turn corresponding to the signal effected by operation of the selector switch lever, the movement of the steering shaft back toward the straight line position effects operation of the switch cams or friction rollers to restore the selector switch to the neutral or "off" position.

As usually installed, such switches require a pre-determined movement of the steering wheel before the self-cancelling means are effected, the amount of requisite steering motion being almost the equivalent of that required for a full 90° turn.

When driving on high speed multi-lane roads, it is customary for the driver to signal a proposed change of lanes by using his direction signal selector switch before "cutting out" or "cutting in" relative to a line of vehicles. The amount of steering wheel movement required for such lane changes is relatively small and not sufficient to effect self-cancellation of the signal as the movement is completed. Hence, unless the driver happens to notice the continued operation of the usual signal pilot lamp, or the position of the selector switch, or hears the ticking of the flasher, the vehicle signal lamps continue to indicate a proposed turn even after the turn has been completed. This is not only an unnecessary load on the signal system and vehicle electrical system, but also, and more importantly, is a definite safety hazard due to the resultant false signalling information given to approaching or following vehicles. Such conditions also occur when the vehicle makes less than the required amount of turn even for any reason.

For the aforementioned self-cancelling action to take place, it is necessary that the selector switch be mounted on the steering column, which is not always the most convenient location. Additionally, modifications frequently must be made to the steering column and shaft to install the self-cancelling arrangement. This has mitigated against the installation of direction signalling systems on vehicles not originally factory-equipped with such systems and, when such a system is added to a vehicle later, it is mechanically unsound to include the self-cancelling feature.

In view of the foregoing considerations, it has been proposed to provide a selector switch in which cancellation is effected by automatic timer controlled means. While such a switch need not be mounted on the steering column and will be automatically restored to neutral a predetermined interval after initial operation, there are attendant disadvantages in that the signal may be cancelled before the vehicle has made its intended turning movement. For example, in heavy traffic, or at intersections, the start of the turning movement of the vehicle may be delayed for a period longer than that for which the cancellation timer is set. This is disadvantageous in that it, too, constitutes a safety hazard through failure to properly and adequately warn approaching or following vehicles of an intended turning movement.

With the foregoing in mind, the present invention is directed to a novel switch including an operator which, when moved to a switch closing position, is automatically latched therein by latch means continuously biased to an operator releasing position and held in latching position by a heat expansible linear element of high electrical resistance. When current flows through this element, it expands and allows the latch to release the operator to open the switch.

Control of the flow of current through the heat expansible element is effected by an electrically heated thermostatic device whose heating circuit is closed responsive to movement of the switch operator to a switch closing position. After a pre-set heating time, this device closes the electric circuit through the expansible element or high resistance wire, and the later expands to release the latch from the switch operator. Return of the operator to the neutral position breaks the heating circuit for the thermostatic device which, upon cooling, opens the circuit for the high resistance wire. The latter then contracts to restore the latch to the latching position.

Means preferably are provided to selectively shunt the heating circuit for the thermostatic device to delay operation of the thermostatic time delay switch opening means. As incorporated in a vehicle turn selector switch, the selective shunting may be provided by completing the circuit for the heating means for the thermostatic device through the brake-switch operated stop lamps. When the brake switch is closed, the heating circuit is effectively shunted until the brakes are released. Thus, the turn signal remains effective until after the vehicle has been in motion for a preset interval.

For an understanding of the invention principles, reference is made to the following description of typical embodiments thereof as illustrated in the accompanying drawing. In the drawing.

Figure 1:
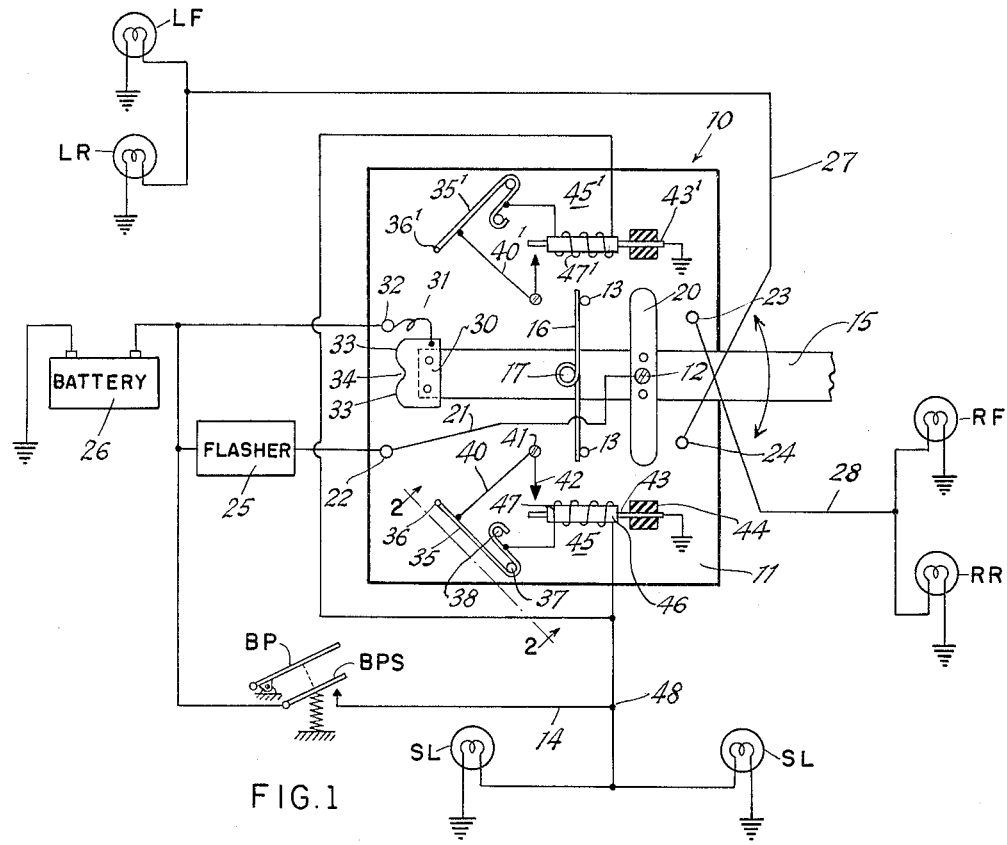
Fig. 1 is a partially schematic plan view and wiring diagram of a vehicle turn signalling arrangement embodying the invention.
Figure 2:
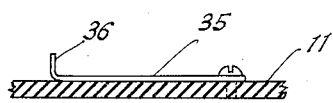
Fig. 2 is a sectional view, on the line 2—2 of Fig. 1, illustrating the releasable latch.

Referring to Figs. 1 and 2, the invention is illustrated as incorporated in a turn signal selector switch 10 for selectively connecting grounded turn signal lamps LF, LR or RF, RR to the grounded vehicle battery through a flasher, to intermittently flash the left or right signal lamps to indicate a proposed turn. The turn signal lamps may be separate units, may be extra filaments in the usual parking and tail lamps, or may be the parking and tail lamps, and are shown as separate units merely for clarity of illustration. The vehicle is also provided with the usual grounded stop lamps SL controlled by a switch BPS closed when brake pedal BP is operated.

Switch 10 includes a dielectric base 11 on which is oscillatably mounted a dielectric selector lever 15, lever 15 being pivoted to base 11 by screw or rivet 12. A spring 16, secured to lever 15 by a pin 17, engages stops 13 on base 11 to bias lever 15 to the illustrated neutral or "restored" position.

A conductive strip or switch closure means 20 is secured to lever 15 at the latter's pivot point, and is electrically connected by a conductor 21 to a terminal 22, on base 11, connected to a flasher 25 in turn connected to battery 26. When lever 15 is operated to signal a turn, strip 20 engages either of a pair of contacts 23, 24 on base 11. Contact 23 is electrically connected by conductor 27 to left signal lamps FL and LR, and a conductor 28 electrically connects contact 24 to right signal lamps RF and RR.

The inner end of lever 15 has secured thereto a conductive latch element or plate 30 electrically connected by a flexible conductor 31 to a terminal 32, on base 11, connected to battery 26. The outer edge of plate 30 has convex cam surfaces 33, 33 intersecting in a notch 34. When lever 15 is moved to an operated position to signal a turn, one cam surface 33 engages and forces outwardly the bent end 35 or 35', so that such bent end will snap into notch 34 to latch lever 15 in the operated position.

As springs 35, 35' and their associated components are mirror copies of each other, only spring 35 and its components will be described in detail, the same reference characters, primed, being applied to switch 35'. Spring 35 comprises a bent spring wire anchored to base 11 by pins 37, 38 in such a manner that its free bent end is normally biased outwardly away from latch plate 30.

A high resistance wire 40, of "Nichrome" or the like, is connected between spring 35 and a screw on pin 41 on base 11. When cold and contracted, wire 40 pulls spring end 36 inwardly to engage in notch 34 of plate 30. When wire 40 has electric current flow therethrough, it heats and expands to allow spring end 36 to move outwardly to disengage latch plate 30. A switch contact 42 is electrically connected to pin 41 for a purpose to be described.

Mounted on base 11 adjacent spring 35 is a thermostatic device generally indicated at 45. Device 45 includes a thermally responsive conductive metal strip 43 anchored at one end in a dielectric mounting 44 secured to base 11. This end of strip 43 is grounded. When heated, strip 43 bends so that its free end engages, and thus grounds, contact 42 and one end of wire 40.

An insulating sleeve 46 is placed on strip 43 and wound with a heating wire 47 connected at one end to spring 35. The heating wires 47, 47' are commonly connected to a point 48 in conductor 14 connecting switch PBS to stop lamps SL.

The switch 10 operates in the following manner. Assuming a right turn is to be signalled, lever 15 is swung counterclockwise until end 36 of spring 35 rides over a cam surface 33 into notch 34, latching lever 15 in its operated position. Right signal lamps RF and RR are now now connected to battery 26 through flasher 25, terminal 22, conductor 21, strip 20, contact 23, and conductor 28. Lamps RF and RR are thus flashingly illuminated.

In this position of lever 15, heating wire or coil 47 is energized as follows: battery 26, terminal 32, conductor 31, latch plate 30, spring 35, coil 47, point 48 and lamps SL. Due to the high resistance of heating coil 47, lamps SL are not effectively illuminated. As coil 47 heats strip 43, the latter bends to engage contact 42, after a pre-set heating interval. This completes a circuit through high resistance wire 40 as follows: battery 26, terminal 32, conductor 31, latch plate 30, spring 35, wire 40, pin 41, contact 42, strip 43, and ground.

Wire 40 heats and expands, allowing end 36 of spring 35 to move out of notch 34 releasing latch plate 30. Spring 16 snaps lever 15 back to the neutral position. As plate 30 disengages spring 35, the heating circuits for wire 40 and coil 47 are broken. Wire 40 contracts to pull spring 35 back to the latching position, and strip 43 cools and straightens to disengage contact 42.

Should the vehicle be stationary before making the indicated turn, the heating of coil 47 is effectively delayed until the vehicle is in motion. With the vehicle stationary, brake pedal BP will be operated, closing switch BPS and energizing lamps SL. This effective shunt around coil 47 places point 48 at substantially battery potential, so that both ends of coil 47 are at substantially the same potential and no current will flow through the coil. When the brakes are released, this shunt is removed, and coil 47 heats strip 43 as described.

The operation of switch 10 in signalling a left turn is similar to that just described, and it is not believed necessary to describe the same in detail.

Figure 3:
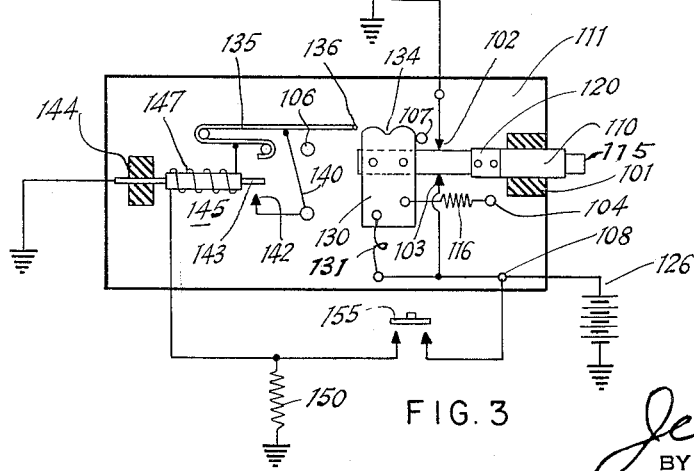
Fig. 3 is a view similar to Fig. 1 illustrating a modification of the invention switch arrangement.

Fig. 3 illustrates the invention as applied to a push button closed switch 110. In this arrangement, a dielectric push button 115 is slidably mounted in a dielectric guide 101 on a dielectric base 111. Push button 115 carries a conductive strip or switch closure means 120 arranged to electrically interconnect contacts 102, 103 when button 115 is pushed in. A conductive latch plate 130 on the inner end of button 115 which is connected by a flexible conductor 131 to contact 108 has a notch 134 which engages the bent end 136 of a spring 135 mounted on base 111. A spring 116, connected between plate 130 and a pin 104 on base 11, biases button 115 outwardly. Stops 106, 107 limits inward and outward movement of button 115.

Contact 102 is connected to a grounded load, such as lamp 105, and contact 103 is connected to a terminal 108 connected to a grounded battery 126. Heating coil 147 is connected to ground through a limiting resistor 150, and a push button 155 is connected between terminal 108 and the ungrounded end of resistor 50.

When button 115 is pushed inwardly, strip 120 connects lamp 105 to battery 126 and latch plate 130 engages spring end 136. Heating coil 147 is thus connected to battery 126 and heats strip 143. After a time, this strip bends to engage contact 142 completing a heating circuit for high resistance wire 140. When the latter expands, spring 135 releases plate 130 so that spring 116 moves button 115 to the switch open position. Push button 155 may be used to selectively shunt coil 147 in the same manner as switch BPS of Fig. 1.

While a specific embodiment of the invention has been shown and described in detail to illustrate the application of the invention principles, it will be understood that the invention may be embodied otherwise without departing from such principles.

I claim:

1. A time delay switch comprising, in combination, a switch operator movable between an operated position and a restored position; switch closure means operatively associated with said operator and operative, in one of said positions, to close a circuit controlled by said switch and, in the other of said positions, to open such circuit; means biasing said operator to the restored position; latch means operable to releasably latch said operator in the operated position, said latch means being biased to the operator-releasing position; electrically energized release means effective, when de-energized, to constrain said latch means to the latching position and, when energized, to release said latch means to the operator-releasing position; a normally open energizing circuit for said release means; a thermostatic device operable, when heated for a pre-set time, to close the energizing circuit of said release means; electric heating means for said device; and an energizing circuit for said heating means closed responsive to movement of said operator to the operated position; whereby, when said operator is moved to the operated position, said heating means is energized to heat said thermostatic device to close the energizing circuit of said release means after such pre-set time.

2. A time delay switch comprising, in combination, a switch operator movable between an operated position and a restored position; switch closure means operatively associated with said operator and operative, in one of said positions, to close a circuit controlled by said switch and, in the other of said positions, to open such circuit; means biasing said operator to the restored position; latch means operable to releasably latch said operator in the operated position, said latch means being biased to the operator-releasing position; electrically energized release means effective, when de-energized, to constrain said latch means to the latching position and, when energized, to release said latch means to the operator-releasing position; a normally open energizing circuit for said release means; a thermostatic device operable, when heated for a pre-set time, to close the energizing circuit of said release means; electric heating means for said device; an energizing circuit for said heating means closed responsive to movement of said operator to the operated position; whereby, when said operator is moved to the operated position, said heating means is energized to heat said thermostatic device to close the energizing circuit of said release means after such pre-set time; and means selectively operable to shunt the energizing circuit for said heating means to delay initiation of heating of said thermostatic device.

3. A time delay switch comprising, in combination, a switch operator movable between an operated position and a restored position; switch closure means operatively associated with said operator and operative, in one of said positions, to close a circuit controlled by said switch and, in the other of said positions, to open such circuit; means biasing said operator to the restored position; latch means operable to releasable latch said operator in the operated position, said latch means being biased to the operator-releasing position; electrically energized release means effective, when de-energized, to constrain said latch means to the latching position and, when energized, to release said latch means to the operator-releasing position; a normally open energizing circuit for said release means; a thermostatic device operable, when heated for a pre-set time, to close the energizing circuit of said release means; electric heating means for said device; an energizing circuit for said heating means closed responsive to latching of said operator by said latch means; whereby, when said operator is moved to the operated position, said heating means is energized to heat said thermostatic device to close the energizing circuit of said release means after such pre-set time.

4. A time delay switch comprising, in combination, a switch operator movable between an operated position and a restored position; switch closure means operatively associated with said operator and operative, in one of said positions, to close a circuit controlled by said switch and, in the other of said positions, to open such circuit; means biasing said operator to the restored position; latch means operable to releasable latch said operator in the operated position, said latch means being biased to the operator-releasing position; electrically energized release means effective, when de-energized, to constrain said latch means to the latching position and, when energized, to release said latch means to the operator-releasing position; a normally open energizing circuit for said release means; a thermostatic device operable, when heated for a pre-set time, to close the energizing circuit of said release means; electric heating means for said device; an energizing circuit for said heating means closed responsive to latching of said operator by said latch means; whereby, when said operator is moved to the operated position, said heating means is energized to heat said thermostatic device to close the energizing circuit of said release means after such pre-set time; and means selectively operable to shunt the energizing circuit for said heating means to delay initiation of heating of said thermostatic device.

5. A time delay switch as claimed in claim 1 in which said release means comprises a high resistance wire electrically and mechanically connected to said latch means, expansible, when heated, to release said latch means and contracted, when cooled, to so constrain said latch means; said latch means being electrically conductive and included in said energizing circuits.

6. A time delay switch as claimed in claim 3 in which said release means comprises a high resistance wire electrically and mechanically connected to said latch means, expansible, when heated, to release said latch means and contracted, when cooled, to so constrain said latch means; said latch means being electrically conductive and included in said energizing circuits.

7. A time delay switch comprising, in combination, a dielectric base; a switch operator movable on said base between an operated position and a restored position; switch closure means operatively associated with said operator and operative, in one of said positions, to close a circuit controlled by said switch and, in the other of said positions, to open such circuit; means biasing said operator to the restored position; a conductive metal latch element carried by said operator; a conductive metal latch spring on said base releasably engageable with said latch element in the operated position of said operator, said latch spring being biased to the operator-releasing position; electrically energized release means effective, when de-energized, to constrain said latch spring to the latching position and, when energized, to release said latch spring to the operator-releasing position; a normally open energizing circuit for said release means including said latch element and said latch spring; a thermostatic device operable, when heated for a pre-set time, to close the energizing circuit of said release means; electric heating means for said device; and an energizing circuit for said heating means closed responsive to movement of said operator to the operated position and including said latch element and said latch spring; whereby, when said operator is moved to the operated position, said heating means is energized to heat said thermostatic device to close the energizing circuit of said release means after such pre-set time.

8. A time delay switch as claimed in claim 7 in which said release means comprises a high resistance wire electrically and mechanically connected to said latch spring, expansible, when heated, to release said latch spring and contracted, when cooled, to so constrain said latch spring.

9. A time delay switch as claimed in claim 7 including means selectively operable to shunt the energizing circuit for said heating means to delay initiation of heating of said thermostatic device.

10. A time delay switch as claimed in claim 7 in which said release means comprises a high resistance wire electrically and mechanically connected to said latch spring, expansible, when heated, to release said latch spring and contracted, when cooled, to so constrain said latch spring; and means selectively operable to shunt the energizing circuit for said heating means to delay initiation of heating of said thermostatic device.

11. A time delay switch comprising, in combination, a dielectric base; a switch operator movable on said base between an operated position and a restored position; switch closure means operatively associated with said operator and operative, in one of said positions, to close a circuit controlled by said switch and, in the other of said positions, to open such circuit; means biasing said operator to the restored position; a conductive metal latch element carried by said operator; a conductive metal latch spring on said base releasably engageable with said latch element in the operated position of said operator, said latch spring being biased to the operator-releasing position; electrically energized release means effective, when deenergized, to constrain said latch spring to the latching position, and when energized, to release said latch spring to the operator-releasing position; a normally open energizing circuit for said release means including said latch element and said latch spring; a thermostatic device operable, when heated for a pre-set time, to close the energizing circuit of said release means; electric heating means for said device; an energizing circuit for said heating means closed responsive to latching of said operator by said latch spring; whereby, when said operator is moved to the operated position, said heating means is energized to heat said thermostatic device to close the energizing circuit of said release means after such pre-set time.

12. A time delay switch as claimed in claim 11 in which said release means comprises a high resistance wire electrically and mechanically connected to said latch spring, expansible, when heated, to release said latch spring and contracted, when cooled, to so constrain said latch spring.

13. A time delay switch as claimed in claim 11 including means selectively operable to shunt the energizing circuit for said heating means to delay initiation of heating of said thermostatic device.

14. A time delay switch as claimed in claim 11 in which said release means comprises a high resistance wire electrically and mechanically connected to said latch spring, expansible, when heated, to release said latch spring and contracted, when cooled, to so constrain said latch spring; and means selectively operable to shunt the energizing circuit for said heating means to delay initiation of heating of said thermostatic device.

15. A turn signalling arrangement for automotive vehicles equipped with a grounded vehicle source of electrical energy, a flasher connected to the source, grounded right and left turn signal lamp means, stop lamp means, and a brake pedal operated switch effective when closed to connect the stop lamp means to the source; said arrangement comprising, in combination, a turn signal selector switch including a dielectric base, a dielectric switch operator oscillatably mounted on said base for movement between a restored position and either of a pair of operated positions; means biasing said operator to the restored position; a pair of switch means each operable, when closed, to connect the signal lamp means on a different side of the vehicle to said flasher and each closed by said operator in a different operated position of the latter and open in the restored position of said operator; a conductive metal latch element carried by said operator and electrically connected to said source, a pair of conductive metal latch springs on said base each releasably engageable with said latch element in a different operated position of said operator, said latch springs being biased to the operator-releasing position, a pair of electrically energized release means each associated with one of said latch springs and each effective, when de-energized, to constrain its associated spring to the latching position and, when energized, to release its associated spring to the operator-releasing position, an energizing circuit for each release means each having one terminal electrically connected to the associated spring, a pair of electrically conductive thermostatic devices each associated with one of said release means and operable, when heated for a pre-set time, to ground the other terminal of the associated release means energizing circuit, electric heating means for each of said devices, and energizing circuits for each heating means each having one terminal connected to said source responsive to movement of said operator to the associated operated position; and circuit means connecting the other terminals of each of said heating means energizing circuits to ground; whereby, when said operator is moved to an operated position, the associated heating means is energized to heat its associated thermostatic device to close the energizing circuit of its associated release means after such pre-set time.

16. A turn signalling arrangement as claimed in claim 15 in which each of said release means comprises a high resistance wire electrically and mechanically connected to its associated spring and to a fixed point on said base and, in its cooled, contracted position so constraining its associated spring.

17. A turn signalling arrangement as claimed in claim 15 in which said circuit means connects the other terminals of said heating means energizing circuits to the ungrounded side of said stop lamp means whereby, when the vehicle brake pedal is operated, said heating means energizing circuits are effectively shunted to delay initiation of heating of said thermo-static devices.

18. A turn signalling arrangement as claimed in claim 15 in which said one terminal of each heating means energizing circuit is electrically connected to the associated latch spring.

No references cited.